United States Patent [19]

Maple et al.

[11] Patent Number: 4,675,100
[45] Date of Patent: Jun. 23, 1987

[54] TREATMENT OF SOUR HYDROCARBON DISTILLATE

[75] Inventors: Ralph E. Maple; Felipe J. Suarez, both of Houston, Tex.

[73] Assignee: Merichem Company, Houston, Tex.

[21] Appl. No.: 739,563

[22] Filed: May 30, 1985

[51] Int. Cl.⁴ .................. C10G 19/00; C10G 19/02
[52] U.S. Cl. ............................ 208/203; 208/263; 208/189
[58] Field of Search .......................... 208/203, 263

[56] References Cited

U.S. PATENT DOCUMENTS

| | | | |
|---|---|---|---|
| 2,176,806 | 10/1939 | Schuessler et al. | 208/203 |
| 2,853,432 | 9/1958 | Gleim et al. | 196/32 |
| 2,921,021 | 1/1960 | Urban et al. | 208/205 |
| 2,988,500 | 6/1961 | Gleim et al. | 208/206 |
| 3,107,213 | 10/1963 | Cole et al. | 208/230 |
| 3,371,031 | 2/1968 | Strong | 208/207 |
| 3,408,287 | 4/1966 | Urban et al. | 208/207 |
| 3,409,543 | 4/1966 | Urban et al. | 208/234 |
| 3,413,215 | 11/1968 | Beshears | 208/206 |
| 3,445,380 | 5/1969 | Urban et al. | 208/206 |
| 3,515,677 | 6/1970 | Pochowicz | 252/430 |
| 3,574,093 | 4/1971 | Strong | 208/206 |
| 3,758,404 | 9/1973 | Clonts | 208/263 |
| 3,923,645 | 12/1975 | Anderson, Jr. et al. | 208/206 |
| 3,977,829 | 8/1976 | Clonts | 267/261 |
| 3,992,156 | 11/1976 | Clonts | 267/261 |
| 4,019,869 | 4/1977 | Morris . | |
| 4,070,271 | 1/1978 | Carlson et al. | 208/263 |
| 4,098,681 | 7/1978 | Carlson | 208/206 |
| 4,121,998 | 10/1978 | Frame | 208/206 |
| 4,121,999 | 10/1978 | Carlson | 208/206 |
| 4,124,493 | 11/1978 | Frame | 208/206 |
| 4,199,440 | 4/1980 | Verachtert | 208/263 |
| 4,206,043 | 6/1980 | Carlson | 208/207 |
| 4,206,079 | 6/1980 | Frame | 252/428 |
| 4,213,877 | 7/1980 | Frame | 252/412 |
| 4,298,502 | 11/1981 | Carlson | 252/431 |
| 4,362,614 | 12/1982 | Asdigian | 208/235 |
| 4,364,843 | 12/1982 | Carlson | 252/430 |
| 4,481,106 | 11/1984 | Verachtert | 208/206 |
| 4,481,107 | 11/1984 | Urban | 208/206 |
| 4,490,246 | 12/1984 | Verachtert | 208/206 |
| 4,498,977 | 2/1985 | Frame | 208/207 |
| 4,498,978 | 2/1985 | Frame | 208/207 |
| 4,502,949 | 3/1985 | Frame et al. | 208/207 |

Primary Examiner—Andrew H. Metz
Assistant Examiner—Helane Myers
Attorney, Agent, or Firm—Baker & Kirk

[57] ABSTRACT

An apparatus and process is described whereby a sour hydrocarbon distillate stream is treated in two oxidation zones within the same reaction vessel to oxidize mercaptans. The initial treatment is in the presence of a fiber bundle and the subsequent treatment over a bed of supported oxidation catalyst.

10 Claims, 2 Drawing Figures

TREATMENT OF SOUR HYDROCARBON DISTILLATE

BACKGROUND OF THE INVENTION

This invention relates to the treatment of sour hydrocarbon distillate to remove mercaptan compounds by contacting the distillate with an alkaline solution.

More particularly, this invention relates to the removal of such mercaptans by a two-stage oxidation contact wherein the first oxidation of the mercaptan compounds occurs while the hydrocarbon and the alkaline solution are in contact with a bundle of a plurality of elongated fibers.

The art relating to the treatment of sour distillate hydrocarbons is well developed and the processes therefor are the subject matter of many patents. For example, U.S. Pat. Nos. 3,758,404, 3,977,829 and 3,992,156 describe mass transfer apparatus and processes involving the use of fiber bundles which are particularly suited for such processes. It is an improvement over the inventions described in such patents and others that this invention is made for the treatment of hydrocarbon distillates contaminated with mercaptan compounds requiring more treatment residence time than are practically possible in a single phase bundle treating process as described in the above mentioned patents in order to accomplish sufficient removal. While satisfactory treatment could be accomplished in a series of such treatment apparatus, it then becomes very expensive and uneconomic. Thus the instant invention is an improvement over such described methods.

The treatment process of this invention will be recognized by those skilled in the art to be particularly suitable for the treatment to effect the catalytic oxidation of the offensive mercaptans contained in sour hydrocarbon distillate such as for example gasoline, including natural straight run and cracked gasolines, naphtha, kerosene, jet fuels, fuel oil and the like.

Commonly used processes for treating sour hydrocarbon distillates entail treating the distillate in contact with a metal phthalocyanine catalyst dispersed in an aqueous caustic solution to yield a doctor sweet product. The sour distillate and the catalyst-containing aqueous alkali metal hydroxide solution provide a liquid-liquid system wherein mercaptans are converted to disulfides in the presence of an oxidizing agent —usually an oxygen contained gas dissolved in the hydrocarbon being treated. Sour hydrocarbon distillates containing more difficulty oxidizable mercaptans are more effectively treated in contact with a metal phthalocyanine catalyst deposited on a high surface area adsorptive support—usually a metal phthalocyanine on an activated charcoal. The distillate is treated in contact with the supported metal phthalocyanine catalyst at oxidation conditions in the presence of an aqueous alkaline solution. One such process is described in U.S. Pat. No. 2,988,500. The oxidizing agent is more often air admixed with the distillate to be treated, and the aqueous alkaline agent is most often an aqueous alkali metal hydroxide, or caustic solution charged continuously to the process or intermittently as required to maintain the catalyst in a caustic-wetted state.

The prior art recognizes that there are limitations on the ability to treat a sour hydrocarbon distillate with a catalytic composite consisting of a metal phthalocyanine disposed on a support material such as the relatively short catalyst life plugging of the catalyst bed, and the required utilization of aqueous-phase alkaline reagents. Various improvements have been developed to further enhance the sweetening ability, including the use of certain additives in the distillate treating process, for instance, a method comprising contacting the distillate at oxidation conditions with a supported metal chelate mercaptan oxidation catalyst and anhydrous ammonia in the absence of an aqueous phase. (U.S. Pat. No. 4,502,949).

It has now been surprisingly discovered that the difficulty oxidizable mercaptan compounds are economically and effectively oxidized and removed to meet mercaptan content specifications of distillate hydrocarbons by the invention as described hereinafter.

SUMMARY OF THE INVENTION

This invention involves an improvement over the treating process employing the equipment and apparatus described in the above mentioned patents whereby the hydrocarbon containing the mercaptan compounds to be oxidized are contacted with an aqueous alkali metal hydroxide solution, an oxidizing agent, preferably air, and a soluble metal phthalocyanine catalyst while in contact with a bundle of elongated fibers contained in a conduit. Upon disengagement from the fiber bundle, the hydrocarbon and the aqueous alkali metal hydroxide solution separate by gravity in a separation zone of the vessel where the aqueous solution becomes a lower phase and the hydrocarbon containing the oxidized mercaptan compounds, which remains as an upper oil phase. This improvement involves then passing the hydrocarbon phase, usually upwardly, through a packed catalyst bed, usually in annular arrangement about the conduit containing the bundle fibers. There, the remaining difficultly oxidizable mercaptan compounds are further oxidized in contact with a supported metal oxidation catalyst, preferably on a carbon support, while being contacted in countercurrent flow with additional aqueous alkali metal hydroxide solution flowing through the catalyst bed. Thus, by so using the second treatment stage with the fixed supported catalyst, longer residence times are possible without the need for the capital expenditure for a second vessel to hold the supported catalyst bed.

The additional residence time in contact with the solid catalyst bed after the more easily oxidized lower mercaptans are oxidized in contact with the fibers provides highly efficient and economic treatment of different sour hydrocarbon distillates containing high levels of mercaptans.

DESCRIPTION OF THE PREFERRED EMBODIMENTS

Figure 1:
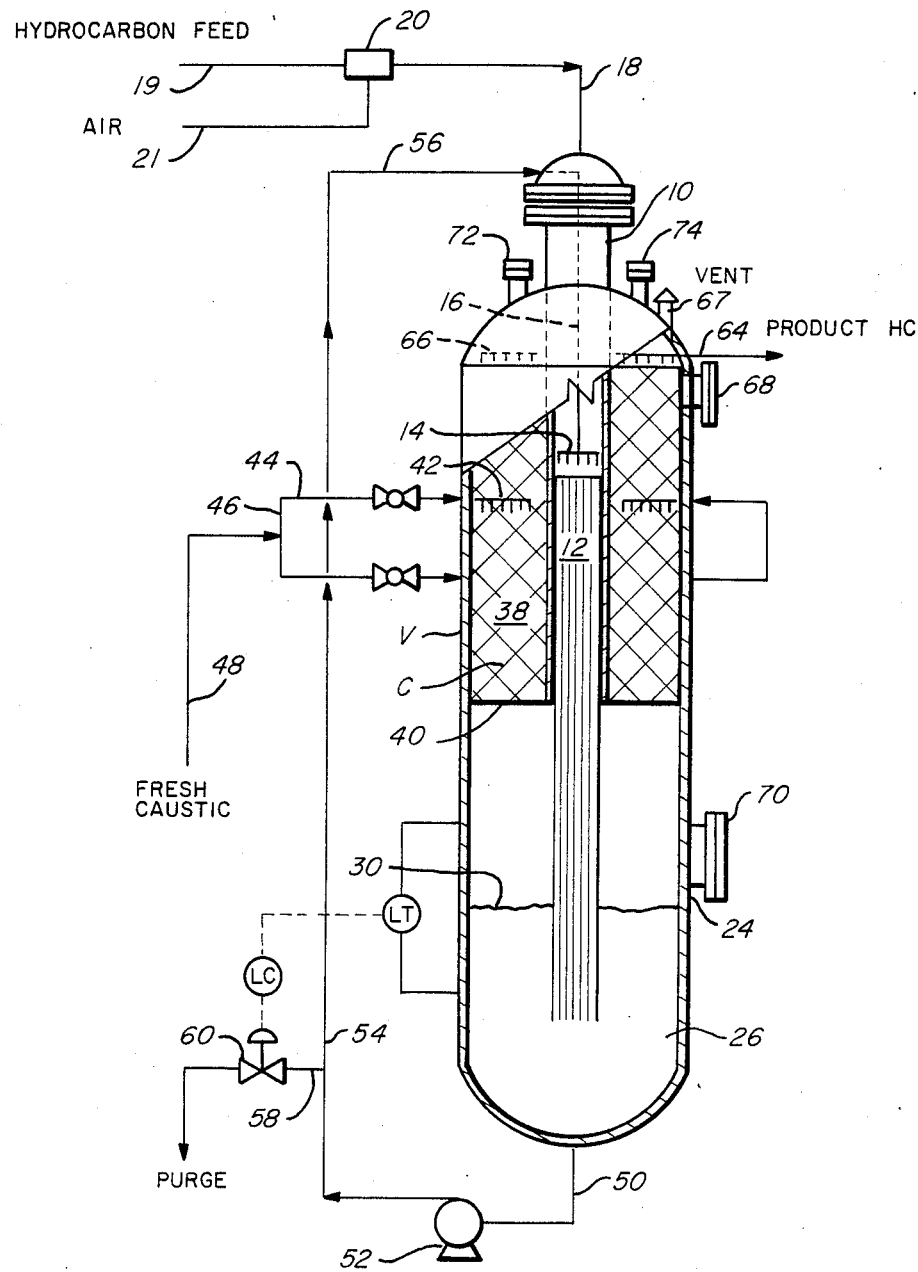
FIG. 1 shows, in schematic form, the apparatus used in the practice of this invention.

Referring to the drawings, FIG. 1 shows a preferred embodiment with conduit 10 having in it a bundle of elongated fibers 12 preferably metallic fibers secured in the conduit 10 for a portion of its length. These fibers 12 are secured at the upstream end in conduit 10, and fed through dispensing means, or distribution grid 14 with aqueous alkali metal hydroxide from tube 16. The hydrocarbon distillate to be treated enters through line 18 fed by charge stock from line 19 which is mixed with oxygen, preferably in form of air, through sparger 20 from intake line 21. Sufficient oxygen will normally be dissolved to oxidize all mercaptans in the hydrocarbon.

At the downstream end of the conduit 10 is a gravity separator 24 into which the downstream end of the fibers 12 extend. This separator 24 is preferably integrated with the Vessel V enclosing the conduit 10.

In operation of the apparatus of FIG. 1 an aqueous alkali metal hydroxide, or caustic, solution is introduced through the tube 16 and distribution means 14 onto the fibers 12. A sour hydrocarbon stream, such as a hydrocarbon distillate, containing mercaptans alone or mercaptans and acidic impurities is introduced into the conduit 10 through the inlet pipe 18. The fibers 12 will be wetted by the aqueous caustic solution in preference to the hydrocarbon mixture. The aqueous caustic solution will form a film on the fibers 12 which will be dragged downstream through the conduit 10 by the passage of the hydrocarbon distillate through the same conduit. Both liquids will be discharged into the separation zone 26 of the separator 24. The volume of the hydrocarbon will be greater because the aqueous caustic passes through the system at a lower volumetric flow rate than the hydrocarbon. During the relative movement of the hydrocarbon with respect to the aqueous caustic film on the fibers, a new interfacial boundary between the hydrocarbon distillate and the aqueous caustic solution is continuously being formed, and as a result fresh aqueous caustic solution is brought in contact with this surface and allowed to react with the mercaptans in the hydrocarbon. While in contact with the fiber bundle 12, acidic impurities commonly found in a hydrocarbon charge stock, phenolics, naphthenic acid and other organic acids are removed from the hydrocarbon distillate.

In the separation zone 26, the aqueous caustic solution will collect in the lower portion as it is heavier than, and immiscible in, the hydrocarbon. The interface 30 within the separator vessel 24 is normally kept at a level above the bottom of the downstream end of the fibers 12 so that the aqueous caustic film can be collected directly in the bottom of the separator 24 without it being dispersed into the hydrocarbon. Thus separated, the hydrocarbon no longer contains phenolate or naphthenate impurities which often cause plugging in a packed bed. Not only does this increase oxidation efficiency, but reduces maintenance costs as well.

The conduit 10 and the fiber bundle 12 enclosed therein are designed, and sized, to have a length and diameter to preferably allow a 10 centimeter per second flow rate and approximately a 1 minute residence time for contact. The aforementioned parameters are preferred and the speed at which the liquids proceed from one end to the other of the bundle 12 can preferably vary from about 2 to about 20 centimeters per second and the residence time from about 30 seconds to about 5 minutes. Longer residence times in contact with the fiber bundle would cause the conduit 10 and the fibers 12 to be of an inordinate length but, because of this invention such lengthy file bundles are unnecessary.

Concurrently with the introduction of hydrocarbon having an oxygen-containing gas, preferably air, dissolved therein, there is introduced through the distribution grid 14 from line 16 an aqueous alkali metal hydroxide, preferably sodium hydroxide, having a concentration of from about 5% to about 50% by weight alkali hydroxide with about 10% to 20% by weight alkali hydroxide being preferred. The amount of aqueous alkali metal hydroxide introduced through the distribution grid 14 is such that the volumetric ratio of hydrocarbon distillate to aqueous caustic is from about 2:1 to about 20:1 with the ratio of from 3:1 to 7:1 being preferred and about 5:1 being especially preferred.

In addition the alkali metal hydroxide solution also includes an oxidation catalyst, the most prevalent and well known catalyst being a soluble phthalocyanine catalyst.

The phthalocyanine catalyst is both very active and highly stable. Because of its high activity, the catalyst is used in small concentrations. These may range from 5 to 500 and preferably 10 to 100 parts per million by weight of the alkaline solution, although lower or higher concentrations may be used in some cases. The use of higher concentrations are unnecessary in most cases but may be used if desired. Because of its high stability, the catalyst is used for long periods of time.

Any suitable alkaline solution is utilized in the process and comprises particularly sodium hydroxide (caustic), potassium hydroxide, etc. The alkaline solution generally is utilized as an aqueous solution of from about 5% to about 50% by weight concentration, more preferably about 10% to 20% by weight concentration. When desired, solutizers, solubilizing agents, and the like are employed including, for example, alcohols, particularly methanol or ethanol, phenols, cresols, butyric acid, naphthenic acid and so forth, in order to increase the contact and/or reaction of the sulfur compounds with the alkaline reagent. In some cases the hydrocarbon distillate contains solutizing agents in sufficient concentration to serve this purpose; otherwise they may be introduced from an extraneous source.

Any suitable phthalocyanine catalyst meeting the requirements of high activity and stability during use may be employed in the present invention. Particularly preferred metal phthalocyanines comprise cobalt phthalocyanine and vanadium phthalocyanine. The metal phthalocyanine in general, is not readily soluble in aqueous solutions and therefore, for improved operation is preferably utilized as a derivative thereof. Particularly preferred derivatives are the sulfonated and carboxylated derivatives, and more particularly the disulfonated derivatives. Thus, a preferred phthalocyanine catalyst comprises cobalt phthalocyanine disulfonate. Another preferred catalyst comprises vanadium phthalocyanine disulfonate.

The aqueous caustic separates from the partially treated hydrocarbon in the separation zone 26 with the aqueous caustic collecting at the bottom of the vessel with the partially treated hydrocarbon at the top of the separator 24 as the top layer outside of the conduit 10 containing the fibers 12 where the hydrocarbon becomes disengaged from the fibers 12. In annular arrangement about the conduit 10 in the vessel V is a catalyst bed C.

In addition to the oxidation catalyst dispersed in the alkali metal hydroxide solution, an oxidation catalyst, preferably a similar phthalocyanine catalyst, is composited with a suitable support. The support should be insoluble in, or substantially unaffected by the caustic solution and hydrocarbons under the conditions prevailing in this subsequent treating zone 38 of the catalyst bed C. Activated carbon is particularly preferred because of its high adsorptivity and stability under these conditions. Other carbon carriers include coke, charcoal which may be obtained from any suitable source including bone char, wood charcoal, charcoal made from cocoa-nut or other nut shells, fruit pits, etc. The choice of the support will be made with reference to its adsorptive or spacing properties and its stability in the alkaline reagent solution and hydrocarbons at the conditions prevailing in the treating zone.

The composite of phthalocyanine and support may be prepared in any suitable manner. In one method the support may be formed into particles of uniform or irregular size and shape, including spheres, prills, pellets rings, saddles, flakes, etc. and then is intimately contacted with the solution of the phthalocyanine catalyst. An aqueous, or alkaline, solution of the phthalocyanine catalyst is prepared and, in a preferred embodiment, the support particles are soaked, dipped, suspended, or immersed in the solution. In another method, the solution may be sprayed onto, poured over or otherwise contacted with the support. Excess solution may be removed in any suitable manner, and the support containing the catalyst allowed to dry at room temperature, in an oven, or by means of hot gases passed thereover, or in any other suitable manner.

In general it is preferred to composite as much catalyst with the support as will form a stable composite although a lesser amount may be so deposited, if desired. In a typical preparation, 1% by weight, of cobalt phthalocyanine sulfonate is composited with activated carbon by soaking granules of the carbon in a solution of the phthalocyanine catalyst. In another method, the carrier may be deposited in the vessel V to form the bed C and the phthalocyanine catalyst solution passed therethrough with subsequent drying in order to form the catalyst composite in situ. If desired, the solution may be recycled one or more times in order to prepare the desired composite. In still another embodiment the carrier may be placed in the vessel V and the vessel V filled with a solution of the catalyst, thereby forming the composite in situ.

The hydrocarbon passes through the catalyst bed C which is designed to have a diameter and length to allow a residence time of from about 5 minutes to about 60 minutes with the preferable residence time being about from 15 to about 25 minutes, most preferably about 20 minutes. A catalyst bed C is supported by a restrainer means such as a screen 40 in the vessel V. As the hydrocarbon being treated is disengaged from the fibers 12 and moves up through the catalyst bed C it is contacted by fresh alkali metal hydroxide in the treating zone 38 being introduced into the bed C through distributors 42 placed within the catalyst bed C. While placement for the distributors 42 is arbitrary, it should be towards the top of the catalyst bed, preferably in the top 25% of the bed, to allow the caustic being introduced at a ratio of up to 1 part by volume per part 5 parts by volume of the hydrocarbon distillate, containing dissolved oxidation gases as hereinbefore discussed to oxidize the mercaptan compounds in the hydrocarbon. The aqueous caustic solution exits the treating zone 38 through the restraining means 40 into the separator 24 wherein it then exits the separation zone 26 through line 50 to pump 52 where it is moved through line 54 to be recirculated for reuse through line 56 into line 16 through the distributors 14 on to the bundle 12. Impurities are removed from the aqueous caustic stream from line 54 through purge line 58 and valve 60 which operates in response to an interface level controller 62 monitoring the aqueous liquid level of the separation zone 26 and removes excess liquid in response to signals from the level controller 62.

The product hydrocarbon containing organic disulfides oxidation product is removed from the catalyst bed C and the reaction vessel V through product line 64 from the collection means 66, which can be any collection means well known in the art. Excess oxidant, usually oxygen gas, invented from the hydrocarbon distillate product through an appropriate vent 67. This vent is shown on vessell V but it is to be understood that it could be from a separately located flash tank. Also, shown on FIG. 1 are access flanges 68 and 70 which are used for maintenance of the vessel V and nozzles 72 and 74, arbitrarily placed in a convenient location for the charging of catalyst to the vessel V.

Figure 2:
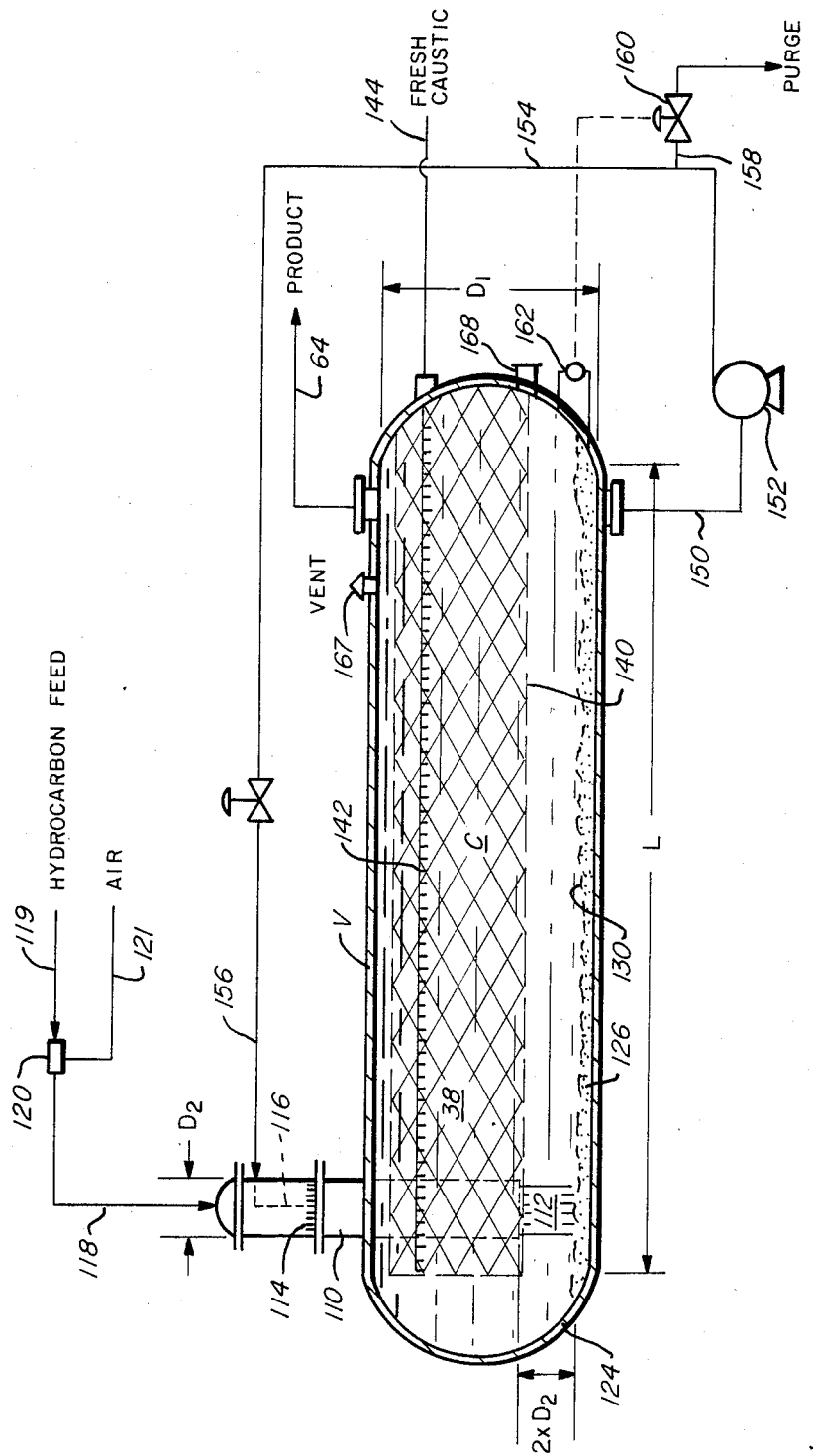
FIG. 2 shows in schematic form an embodiment of this invention employing a horizontally oriented catalyst bed.

FIG. 2 is a schematic which shows the bed C disposed in a horizontal configuration about the conduit 110. The foregoing description is equally applicable to describe the embodiment of FIG. 2 and therefore the last two digits of the numbers identifying like elements in FIG. 1 are identical with the same element in the description thereof. Rather than repeat the foregoing discussion of the vertically arranged reactor, the discussion is incorporated herein by reference, with the numbering changes mentioned above.

The process of this invention to oxidize mercaptans contained in the hydrocarbon feed described above takes place in contact with the fiber bundle 12 and 112 in the conduit 10 and 110 at a temperature of between about 60° F. (16° C.) and about 200° F. (93° C.), preferably from about 90° F. (32° C.) and about 150° F. (66° C.) at a pressure of from about 2.5 to about 15 atmospheres, preferably from about 3 to about 10 atmospheres. The foregoing temperatures and pressures allow the separation of excess oxygen and any inert dissolved gases from the hydrocarbon through vent 67 or 167 without hydrocarbon entrainment or loss with the vented gas.

The same temperatures and pressures of course prevail as the hydrocarbon distillate courses upwardly through the catalyst bed C, in both embodiments, nests upon a restraining means 40 and 140 positioned above the average location of the interface 30 and 130 of the hydrocarbon and aqueous fluids and preferably at a distance of about twice the diameter of the conduit 10 and 110. Referring to FIG. 2, the diameter of the conduit 110 is shown as D2 and the vessel V as D1. The restraining means 140 is placed at a distance of about twice D2.

Thus, from the above discussion the great advantages of this invention are apparent. The fiber bundle oxidation step acts to pre-treat the hydrocarbon stream by oxidizing the lower mercaptans and removing the phenolates and naphthenates which have bed-plugging potential and the packed catalyst bed provides additional catalyst and residence time to oxidize the more difficultly oxidized mercaptans. In view of the foregoing, those of ordinary skill in the art will perceive, and can practice many variations of the foregoing invention without departing from the scope and purposes of the claims hereof.

What is claimed is:

1. In the process of oxidizing mercaptan compounds contained in hydrocarbon distillates, comprising the steps of contacting the distillate in the presence of a fiber bundle with a gaseous oxygen oxidant and an aqueous alkali metal hydroxide solution containing an oxidation catalyst for a period of time sufficient to oxidize at least a portion of the mercaptan compounds in the hydrocarbon distillate and separating the aqueous alkali metal hydroxide from the treated hydrocarbon distillate, the improvement which comprises:

disengaging the hydrocarbon distillate and oxidant gas from the presence of the fiber bundle;

contacting the hydrocarbon distillate and oxidant gas with a bed of supported oxidation catalyst in the presence of an aqueous alkali metal hydroxide solution having a content of from about 5 wt % to about 50 wt % of an alkali metal hydroxide for a residence time of from about 5 minutes to about 60 minutes; and recovering the product hydrocarbon distillate from such catalyst zone.

2. The process of claim 1 wherein the supported oxidation catalyst is a metal phthalocyanine supported on a carbon support.

3. The process of claim 2 wherein the catalyst is cobalt phthalocyanine disulfonate.

4. The process of claim 3 wherein the support is an activated carbon.

5. The process of claim 1 wherein the alkali metal hydroxide in sodium hydroxide in a concentration from about 10% to about 20% by weight and the residence time is from about 15 to about 25 minutes.

6. An improved process for treating sour hydrocarbon distillate having mercaptan compounds therein, wherein said sour hydrocarbon distillate may also have acidic impurities therein, comprising the steps of:

contacting said hydrocarbon distillate in the presence of a fiber bundle with a gaseous oxygen oxidant and a first aqueous alkali metal hydroxide solution having an oxidation catalyst therein at a temperature and pressure and for a period of time sufficient to oxidize at least a portion of said mercaptan compounds and to remove at least a portion of said acidic impurities from said hydrocarbon distillate;

separating said first aqueous alkali metal hydroxide solution from the treated hydrocarbon distillate;

contacting said treated hydrocarbon distillate and oxidant gas in the presence of a bed of supported oxidation catalyst with a second aqueous alkali metal hydroxide solution at a temperature and pressure and for a period of time sufficient to oxidize at least a portion of the remaining mercaptan compounds from said treated hydrocarbon distillate; and recovering the product hydrocarbon distillate from such catalyst zone.

7. The improved process of claim 6, further comprising the step of feeding said hydrocarbon distillate, gaseous oxygen oxidant, first aqueous alkali metal hydroxide solution and oxidation catalyst into a vessel having said fiber bundle, said bed of supported oxidation catalyst and a separator therein.

8. The improved process of claim 6, wherein the step of contacting the hydrocarbon distillate in the presence of said fiber bundle comprises the steps of:

introducing said first aqueous alkali metal hydroxide solution having said oxidation catalyst therein onto an upstream end of said fiber bundle; and flowing said hydrocarbon distillate having said gaseous oxygen oxidant dissolved therein concurrently with and in contact with said first alkali metal hydroxide solution.

9. The improved process of claim 6, wherein the step of separating said first alkali metal hydroxide solution from said treated hydrocarbon distillate comprises the steps of:

discharging said first aqueous alkali metal hydroxide solution and said treated hydrocarbon distillate from said fiber bundle into a separator;

collecting said first aqueous alkali metal hydroxide solution in the lower portion of said separator; and collecting said treated hydrocarbon distillate in the upper portion of said separator.

10. The improved process of claim 6, wherein the step of contacting said treated hydrocarbon distillate and oxidant gas in the presence of said bed of supported oxidation catalyst comprises the steps of:

passing said treated hydrocarbon distillate and oxidant gas from said separator through said bed of supported oxidation catalyst;

introducing said second stream of aqueous alkali metal hydroxide solution into said bed of supported oxidation catalyst; and flowing said second aqueous alkali metal hydroxide solution counterconcurrently through said bed of supported oxidation catalyst with and in contact with said treated hydrocarbon distillate.

* * * * *